United States Patent [19]
Kadar et al.

[11] Patent Number: 5,884,294
[45] Date of Patent: Mar. 16, 1999

[54] SYSTEM AND METHOD FOR FUNCTIONAL RECOGNITION OF EMITTERS

[75] Inventors: Ivan Kadar, Flushing, N.Y.; Scott A. Schellhammer, Alexandria, Va.

[73] Assignee: Northrop Grumman Corporation, Los Angeles, Calif.

[21] Appl. No.: 844,685

[22] Filed: Apr. 18, 1997

[51] Int. Cl.⁶ ............................................. G06F 15/18
[52] U.S. Cl. .......................... 706/10; 705/52; 382/155; 382/159
[58] Field of Search .................. 706/10, 52, 49; 395/180, 182.09; 382/155, 156, 157, 158, 159

[56] References Cited

U.S. PATENT DOCUMENTS

| | | | |
|---|---|---|---|
| H1415 | 2/1995 | Merryman | 706/22 |
| 4,918,620 | 4/1990 | Ulug | 706/59 |
| 4,945,494 | 7/1990 | Penz et al. | 706/25 |
| 4,985,824 | 1/1991 | Husseiny et al. | 706/52 |
| 5,040,215 | 8/1991 | Amano et al. | 704/232 |
| 5,046,019 | 9/1991 | Basehore | 706/1 |
| 5,073,867 | 12/1991 | Murphy et al. | 706/42 |
| 5,130,936 | 7/1992 | Sheppard et al. | 702/123 |
| 5,136,685 | 8/1992 | Nagazumi | 706/1 |
| 5,179,624 | 1/1993 | Amano et al. | 704/232 |
| 5,204,718 | 4/1993 | Morita | 399/74 |
| 5,248,873 | 9/1993 | Allen et al. | 250/208.1 |
| 5,251,144 | 10/1993 | Ramamurthi | 364/474.19 |
| 5,263,120 | 11/1993 | Bickel | 706/62 |
| 5,268,835 | 12/1993 | Miyagaki et al. | 364/151 |
| 5,309,921 | 5/1994 | Kisner et al. | 600/532 |
| 5,361,628 | 11/1994 | Marko et al. | 73/116 |
| 5,402,520 | 3/1995 | Schnitta | 706/16 |
| 5,434,927 | 7/1995 | Brady et al. | 382/104 |
| 5,444,820 | 8/1995 | Tzes et al. | 706/21 |
| 5,648,782 | 7/1997 | Albo et al. | 342/26 |
| 5,715,821 | 2/1998 | Faupel | 706/20 |
| 5,724,486 | 3/1998 | Wang | 706/10 |
| 5,751,910 | 5/1998 | Bryant et al. | 706/2 |
| 5,751,915 | 5/1998 | Werbos | 706/4 |
| 5,761,326 | 8/1998 | Brady et al. | 382/103 |

OTHER PUBLICATIONS

"An Introduction to Computing with Neural Nets", Richard P. Lippmann, IEEE ASSIP Magazine, Apr. 1987, pp. 4–22.
"Multi–Spectral Data Fusion Using Neural Networks", Richard Haberstroh et al., SPIE, Bellingham, WA, vol. 1955, 1993 (11pgs.).
"Outline of a New Approach to the Analysis of Complex Systems and Decision Processes", Lofti A. Zadeh, IEEE Transactions On Systems, Man, An Cybernetics, vol. SMC–3, Jan. 1973, pp. 28–44.
"Proceedings of the Digital Optical Computing Conference," Non–Bayesian Image Feature Detectors, Ivan Kadar et al., SPIE vol. 752, Jan. 13, 1987, (7 pages).

(List continued on next page.)

Primary Examiner—Robert W. Downs
Attorney, Agent, or Firm—Terry J. Anderson; Karl J. Hoch, Jr.

[57] ABSTRACT

The present invention relates to a radar emitter recognition system and method for classifying incoming emitters into their functional roles as disclosed by their electronic signatures and the context within which the radar transmissions are received. An electronic support system provides incoming data, including unknown attribute information, to a neural network which has been synthesized or trained to calculate a network solution indicative of an emitter's classification within a range of attributes. Similarly the electronic support system provides incoming data, including unknown context data, to a fuzzy logic system that has been provided with possibility distributions to classify the emitter as originating from one of several strategic contexts. The resultant categorizations from the neural network and the fuzzy logic system are combined in a classifier to yield an improved recognition of the emitter under observation. This system and method of using a neural network and fuzzy logic is also applicable to other recognition problems in a number of fields.

17 Claims, 10 Drawing Sheets

OTHER PUBLICATIONS

"Working with neural networks", Dan Hammerstrom, IEEE Spectrum Jul. 1993, pp. 46–53.

"Fuzzy decision making in the classification of multisource remote sensing data", Elisabetta Binaghi et al., Optical Engineering, vol. 32, No. 6, Jun. 1993, (12 pages).

L. Xu, et al., "Methods of Combining Multiple Classifiers and Their Applications to Handwriting Recognition," IEEE Trans. on Systems, Man, and Cybernetics, vol. 22(3), pp. 418–435, May 1992.

T.K. Ho, et al., "On Multiple Classifier Systems for Pattern Recognition," Proc. 11th IAPR Int'l. Conf. on Pattern Recognition, vol. II, pp. 84–87, Aug. 1992.

S. Beck, et al., "Robust Classification Techniques for Acoustic Signal Analysis," IEEE Sixth SP Workshop on Statistical Signal and Array Processing, pp. 457–460, Oct. 1992.

"AIM Outperforms Neural Nets & Regression," PCAI, p. 13, Jul. 1993.

Y.S. Huang and C.Y. Suen, "Combination of Multiple Classifiers with Measurement Values," Proc. Second Int'l. Conf. on Document Analysis and Recognition, pp. 598–601, Oct. 1993.

M.-Y. Chow and P.V. Goode, "Adaptation of a Neural/Fuzzy Fault Detection System," Proc. 32nd Conf. on Declaration and Control, vol. 2, pp. 1733–1738, Dec. 1993.

T.K. Ho, et al., "Decision Combination in Multiple Classifier Systems," IEEE Trans. on Pattern Analysis and Machine Intelligence, vol. 16(1), pp. 66–75, Jan. 1994.

S.-B. Cho and J.H. Kim, "Combining Multiple Neural Networks by Fuzzy Integral for Robust Classification," IEEE Trans. on Systems, Man, and Cybernetics, vol. 25(2), pp. 380–384, Feb. 1995.

| BAND | PRF (Hz) |
|---|---|
| VHF, UHF, L | 400<br>500<br>600 |
| S, C, X | 6,400<br>8,000<br>9,600 |
| Ku, K, Ka, MMW | 20,000<br>25,000<br>30,000 |

TYPICAL PULSE REPETITION FREQUENCIES

FIG.2B

| BAND | CENTER FREQUENCY |
|---|---|
| VHF | 30–300 MHz |
| UHF | 300–1,000 MHz |
| L | 1,000–2,000 MHz |
| S | 2,000–4,000 MHz |
| C | 4,000–8,000 MHz |
| X | 8,000–12,000 MHz |
| Ku | 12–18 GHz |
| K | 18–27 GHz |
| Ka | 27–40 GHz |
| MMW | 40–300 GHz |

TYPICAL CENTER FREQUENCY RANGES

FIG.2C

| MEAN [n mi] | SIGMA | TERRAIN |
|---|---|---|
| 10 | 2% | MOUNTAINOUS, VERY CLUSTERED |
| 13 | 4% | COASTAL, CLUSTERED |
| 20 | 6% | COASTAL, PARTIALLY SCATTERED |
| 37 | 8% | FLATLAND, SCATTERED |
| 81 | 10% | FLATLAND, VERY SCATTERED |

BEARING REGIONS

FIG.7A

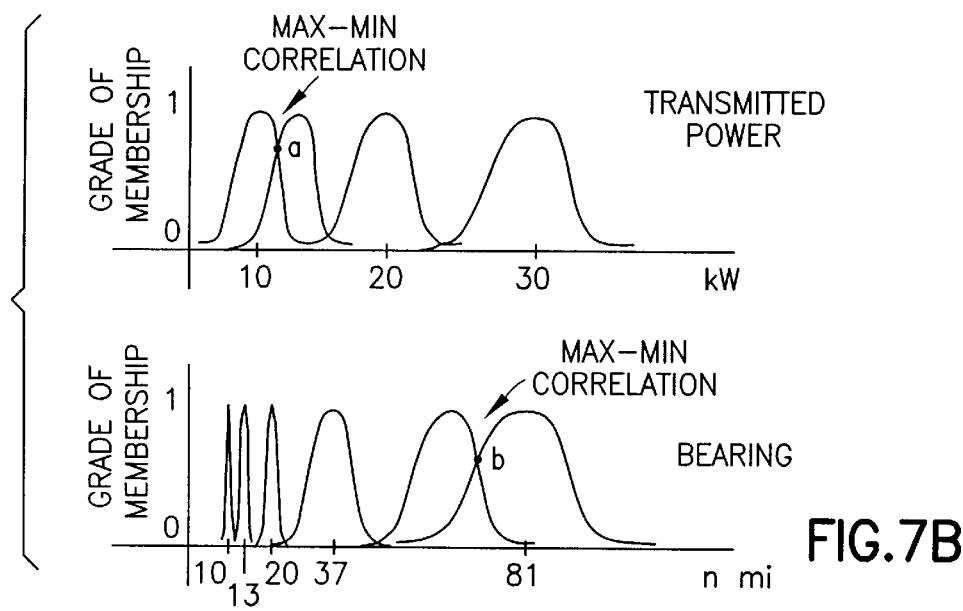

FIG.7B

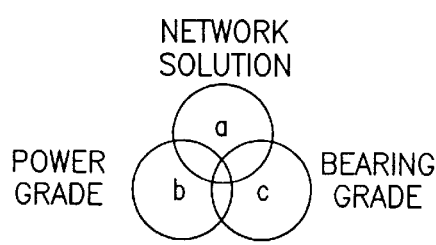

PROBABILISTIC DISTANCE MEASURE

ASSUMING INDEPENDENT VARIABLES:
CONFIDENCE LEVEL −P[NETWORK AND POWER AND BEARING]
−P[NETWORK]* P[POWER]* P[BEARING]
−a* b* c

MAX−MIN CORRELATION AND PROBABILISTIC DISTANCE MEASURE

FIG.7C

SYSTEM AND METHOD FOR FUNCTIONAL RECOGNITION OF EMITTERS

BACKGROUND OF THE INVENTION

1. Field of the Invention

The present invention relates to a radar emitter recognition system and method using a neural network and a fuzzy logic technology for classifying incoming emitters into their functional roles based on operational and physical attributes detected in electronic signatures and the context within which the transmissions were received.

2. Description of the Related Art

Reconnaissance aircraft often include electronic sensor systems capable of intercepting electromagnetic radiation in frequency spectrums typically occupied by offensive and defensive military weapon systems. The radio wave receivers, signal processors and computers in such systems combine to classify the receptions into strategic information used in identifying, not only the sites where the intercepted receptions were originated, but for subsequent missions, specific targeting information. Systems that can accurately classify new sites on the basis that they exhibit similar radar transmission features as previously sensed sites also improves the military's overall command and control, and specifically aids in threat assessment which often proves vital to a mission's success.

The sensor systems available today are faced with identifying a wide variety of disparate electromagnetic transmissions, often emanating from radar sites. A number of variables such as a site's location, terrain, clustering of sites, transmission frequencies, modulation techniques, continuous vs. pulsed transmissions, differing pulse widths, varying power levels, and transmitting antenna radiation patterns make reliable automatic identification of operational and physical characteristics difficult.

The sensing detection systems include wide band receiving antennas, preprocessors, pulse storage buffers and digital signal processors supplying input data to sundry classification schemes. The preprocessors are designed to filter out and retain salient signal features from a transmission's electronic signature. Once such salient features are distilled, pattern recognition techniques use these features to determine a radar site's operational and functional specification. It is common for homing missiles to include such systems in structuring their mission, and to ultimately select a target emitter's electronic signature.

A neural network is an organized arrangement of processing elements which operate in a parallel fashion to solve particular recognition tasks Reference in this regard can be had to Lippmann, Richard P., "An Introduction to Computing with Neural Nets", IEEE ASSP Magazine, April 1987. Conventional neural networks use processing components which typically deal with discrete data that represent the elements from the data base under observation, more particularly in this invention, the features of an emitter's electronic signature. A neural network also contains several functions referred to as layers, such as an input layer, an output layer and one or more hidden layers, each having at least one input node. The nodes and layers cooperate to produce output signals that represent the product of the input signals multiplied by a weight and summing the respective products from each output node. Individual weights are determined during a learning phase which essentially synthesizes the learning patterns to be subsequently recognized. In the most general way the neural network consolidates a multitude of data into a single datum by taking the inner product of a weighted vector and an input vector and comparing the two against a preestablished criterion.

Fuzzy logic systems relate to processes capable of extending conventional Boolean logic principles to handle the more general case of partial truth values, for example as supplied by sensor signals, using algorithms based on rules of inference rather than deterministic mathematical models, which for some problem solving presents a formidable or impossible task. These rules typically follow the form of the familiar mathematical notions of intersection, union and complement. A fuzzy-based classifier compares the variable under observation to a preestablished possibility function, based on known characteristics of the context class, and determines tile variable's similarity to the known context class.

It is known to use neural networks in applications involving signal classification. For example, U.S. Pat. No. 4,945,494 (Penz et al.) discloses an application using neural networks to cluster a plurality of radar signals into classes and a second neural net to identify these classes as known emitter types. Penz et al. does not disclose the utilization of a fuzzy logic paradigm to improve on the accuracy of the classification, and further utilizes two rather than one neural network to cluster the attributes received from an avionic sensor system.

The following U.S. Patents also disclose the use of neural networks in pattern recognition schemes to classify stock market signals, seismic data, radar, sonar, constituents of exhaled breath and two-dimensional images. See U.S. Pat. No. 5,402,520 Schnitta and U.S. Pat. No. 5,248,873 Allen et al. Neither of these patents disclose the use of neural networks combined with fuzzy logic as a construct of the classification solution.

A number of U.S. Patents do disclose recognition systems which classify input signals using both neural networks and fuzzy logic systems: U.S. Pat. No. 5,361,628 Marko et al., U.S. Pat. No. 5,268,835 Miyagaki et al., U.S. Pat. No. 5,204,718 Morita, U.S. Pat. No. 5,179,624 Amano et al., U.S. Pat. No. 5,130,936 Shepard et al., U.S. Pat. No. 5,037,867 Murphy et al., U.S. Pat. No. 5,046,019 Basehore, U.S. Reg. No. H1415 Merryman and U.S. Pat. No. 5,309,921 Kirsner et al. Each of the cited patents differs from the present invention in one or more of the following respects: the manner in which the neural network and fuzzy logic cooperate, the type of neural network employed and the fuzzy logic algorithms used to ascertain the respective degrees of membership in the class under observation. Furthermore, none of these patents employ a probability distance metric which, in accordance with an aspect of the present invention, dramatically improves the classification of emitter-based incoming features.

Presently known systems and methods simply do not combine measurements having both quantitative attribute and qualitative contextual characteristics to determine a functional recognition, as is disclosed by the teachings of this invention.

SUMMARY OF THE INVENTION

The present invention is a system and a method for recognizing and classifying features of incoming data. The system and method uses incoming data obtained from an emitter's signature and other observable characteristics, referred to as attributes and contexts, respectively. These data define the functional characteristics of a radar site from which they are obtained. The attribute data is passed to a neural network for classifying emitters having similar qualities. The context data is passed to a fuzzy logic system which is configured to classify one of several strategic contexts.

The system for recognizing and classifying features of incoming data includes an input for inputting data representative of a specific attribute and a specific context of an emitter; a neural network having an input to receive the specific attribute data and an output network solution responsive to the emitter's functional role; a fuzzy logic system having an input to receive the specific context data, where the context data is compared against stored possibility distributions to ascertain a membership function indicative of the emitter's context; and finally a calculation of the product of the network solution and the membership function creating a probability distance measure indicative of the emitter's classification.

In tile present embodiment a neural network paradigm is used to classify unknown emitter attributes after training on simulated measurement data representative of hypothetical electronic support measurement data representative of hypothetical electronic support measure sensor observations. In the present invention a fuzzy logic system combines its output with the neural network to produce a probability distance metric that improves on the final classification of the emitter under observation.

The neural network creates a synthesized polynomial network by utilizing a supervised abductive learning or training algorithm to operate on a priori observations to thereby encode itself to recognize the unknown attribute incoming data. In the present embodiment the neural network learns by testing different training data in a process that synthesizes layers representing polynomials up to and including the third degree. A simulated training data base can be utilized which comprises specific attributes based on a priori observations (which include noise).

The fuzzy logic system processes context data by extending conventional Boolean logic principles to handle tile more general case of partial truth values between the logical extremes of true and false. The extended Boolean logic principles use algorithms based on rules of inference to determine grades of membership of unknown emitters when compared to possibility distributions constructed from data from known emitters. Such a rule of inference is expressed as a max-min correlation distance which is used in conjunction with the network solution to produce a probability distance metric indicative of the emitter's functional recognition.

The fuzzy logic system uses, as a criterion for comparison, normalized possibility distributions constructed from a priori observations of known context. The comparisons produce a grade in membership expressed in the form of the max-min correlation metric. Three outcomes are possible when the correlator determines that the emitter is with the domain of a priori contexts: the emitter is classified, the emitter is deemed new, or is assumed to have changed "colors" by altering its signature.

The system as described is also implementable as a method for recognizing and classifying features of incoming data. Such a method comprises the steps of inputting data representative of a specific attribute and a specific context of an emitter; applying the specific attribute data to a neural network which provides an output network solution responsive to the emitters functional role; applying the specific context data to a logic means having one or more stored possibility distributions, computing a grade of membership indicative of the emitter's grade of membership, and calculating a probability distance measure based on the product of the network solution and the grade of membership.

An object of the present invention is to classify an unknown emitter as a member of a class of known emitters based on the emitter's electronic signature and other observations.

Another object of the present invention is to classify an unknown emitter as a member of a class of known emitters based on a neural network and fuzzy logic system, used in combination in a classifier, to yield an improved recognition of the emitter.

A third object of the present invention is to recognize a new emitter and to include it as a new member of a class of known emitters based on the emitter's electronic signature and other observations previously unknown.

Still another object of tile present invention is to recognize when an unknown emitter has changed "colors" in an attempt to avoid classification as a member of a class of known emitters.

Yet another object of the present invention is to permit real time updating of neural network and fuzzy logic possibility distributions to add both new emitters and known emitters which have changed "colors".

BRIEF DESCRIPTION OF THE DRAWINGS

The novel features of the invention are set forth with particularity in the appended claims. The invention itself, however, both as to its organization and method of operation, together with further objects and advantages thereof, may be best understood by reference to the following description taken in conjunction with the accompanying drawings, in which:

FIG. 2B is a table of typical center frequencies used in the attribute data base of FIG. 2A.

FIG. 2C is a table of typical pulse repetition frequencies used in the attribute data base of FIG. 2A.

FIG. 7A is a table of typical bearing regions used in creating the bearing context data base of FIG. 6.

FIG. 7B depicts max-min correlation in two graphical representations, one of context data transmitted power against a grade of membership and the other of context data bearing against the grade of membership.

FIG. 7C illustrates a probabilistic distance measure.

DESCRIPTION OF THE PREFERRED EMBODIMENTS

Figure 1:
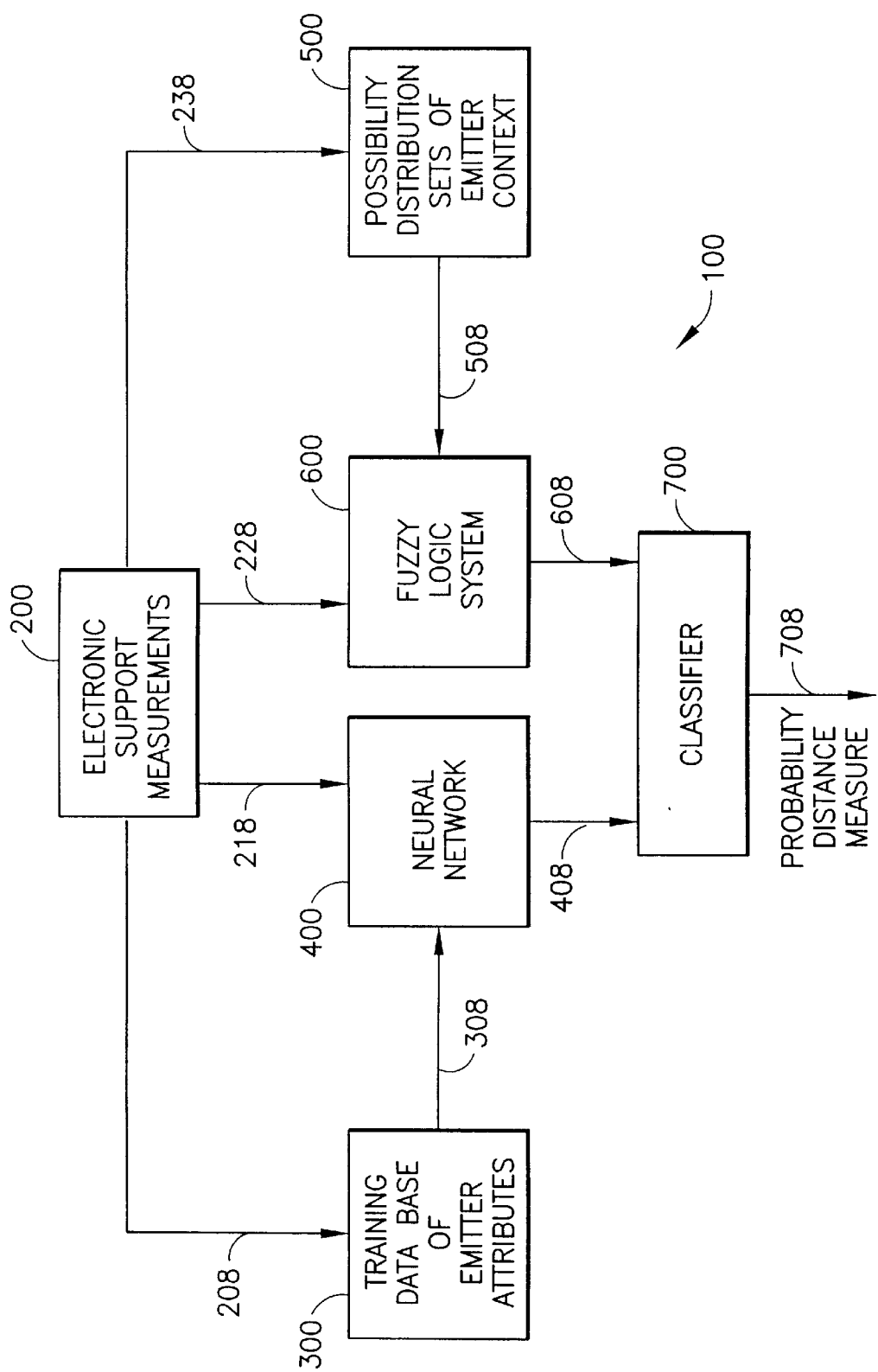
FIG. 1 is a high-level block diagram of a functional recognition system 100 in accordance with the preferred embodiment of the present invention.

FIG. 1. is a data flow block diagram of a radar emitter recognition process in accordance with a preferred embodiment of the present invention. Briefly, the functional recognition system 100 obtains, through an electronic support system 200, sensor measurements representing known ground-based radar emitters deployed in various physical locations. A set of sensor measurements that exemplify elements of an emitter's salient identification features is used by a preprocessor (not shown) to create a training data base 300 of the functional emitter attributes, and is also used to generate possibility distribution functions 500 of emitter contexts. The training data 308 from the database 300 supplies input data to synthesize a neural network 400, such that when subsequently presented attribute data from an unknown emitter, it classifies the emitter into one of several possible categories. The output 508 of the possibility distribution function database 500 is used in connection with a fuzzy logic system 600. Within a certain range of data the fuzzy logic system 600 classifies the emitter as originating from one of several strategic contexts. Due to inherent limitations in the ability of either neural network or fuzzy logic technology, operating alone, to fully provide unambiguous recognition under certain conditions of statistical variability in features of attribute and context, the resultant classifications from the neural network 400 and the fuzzy logic system 600 are combined in a classifier 700 to yield an improved recognition 708 of an emitter under examination.

Blocks 200, 300, 400, 500, 600, and 700 represent functions of the recognition process according to the present invention, and will generally be referred to as "functions". All arrows, such as by way of example, 208, 218, 228, 238, 308, 408, 508, 528, 608, 618, 628, 638, and 708 may be implemented as electrical wires or data busses, which transport electrical signals. Alternatively, one or more arrows 208 through 708 may represent communication (e.g., data flow) between software routines, particularly when the present method or apparatus of the present invention is implemented as a computer controlled process as in the preferred embodiment. The overall operation of the recognition analysis process 100 will now be described in more detail.

Returning to FIG. 1, the electronic support system 200 includes sensor systems typically located on board a reconnaissance aircraft or homing missile. These systems are essentially wide band radar receiving units capable of intercepting electromagnetic radiation in frequency spectrums typically occupied by offensive and defensive military weapon systems. The output of the electronic support system 100 feeds receiving systems, signal processors and computers that combine to classify the receptions into strategic information that is useful in identifying not only the sites where the intercepted receptions originated, but for subsequent missions, rapid identification of new sites that exhibit similar radar transmission features.

A radar site's electronic emittance signature, physical makeup and relative location have proven to represent important factors for determining a radar site's strategic capabilities. A signature contains information about the radar's center carrier frequency, its pulse repetition frequency, and its sector coverage, collectively referred to as its attributes. The center carrier frequency is the radar transmission frequency and typically evidences a radar installation's strategic mission. The pulse repetition frequency typically discloses the capabilities of a radar system to track at particular ranges for selected target velocities. Sector coverage, as measured in angular units, is indicative of the scanning capabilities of a radar site. Contextual information is also derived from the received signal. For example, the power detected from a radar site may give evidence of its physical configuration, since the configuration often places limits on maximum achievable power levels. Other contextual information useful in recognition is bearing, or the relative location of a radar site in a mission scenario, since location implies certain enemy deployment strategies.

Some emitters will be acquired whose attributes resemble the attributes observed a priori, but will disclose contexts different from a priori observations. For example, an emitter signature may be inconsistent with the observed power level. In these cases the emitter is determined to be a new emitter, and is added to the knowledge data base by updating the neural network and possibility distributions, accordingly.

In certain strategic scenarios, in an attempt to fool one's enemy, the signatures of emitters are altered, thus disguising the radar's physical constraints. In these cases the processed data simply confirms the presence of an emitter that is not within the data base of known emitters which is utilized in synthesizing the neural network or fashioning the possibility distributions. Typically attributes outside the range of a priori observations, in combination with contexts within the range of a priori observations, indicate the emitter's attempt to disguise itself These so-called "color changes" are flagged by the recognition system. Especially in this case, the recognition accuracy dramatically improves when the product of the neural network solution 408 is combined with power and bearing grade of membership data 608, producing a probability distance measure 708.

It is generally accepted in the prior art that classification precedes measurement. Therefore, known or a prior classification is an important first step for the neural network 400 to undergo training or synthesis, and for the fuzzy logic system 600 to have comparison data with which to make statistically meaningful calculations. The neural network 400 may be implemented in hardware, firmware, or a computer process performed by a computer as in the preferred embodiment. This manner of classifying implies having to identify the salient classification features for ultimate recognition, as well as acquiring and formating a statistically significant training data base. In the present embodiment training data in the form of vectors enters the neural network 400 via the training data vector flow arrow 308. The training data vectors can originate from one of several sources. For example, and preferably, they can be assembled from actually acquired and prerecorded emitter signatures. However, the training data vectors also can be synthesized from hypothetical parameters to effectively simulate actually acquired data.

The following discussion provides a technique for training the recognition system based on representative data to which random fluctuations representing noise can be added. However, in practice the recognition system may be trained by inputting data obtained from measurements of actual emitters within an area of interest. In this case the acquired signatures will include noise. This creates a partitioned data set with known attributes (see block 350 in FIG. 2A).

Figure 2A:
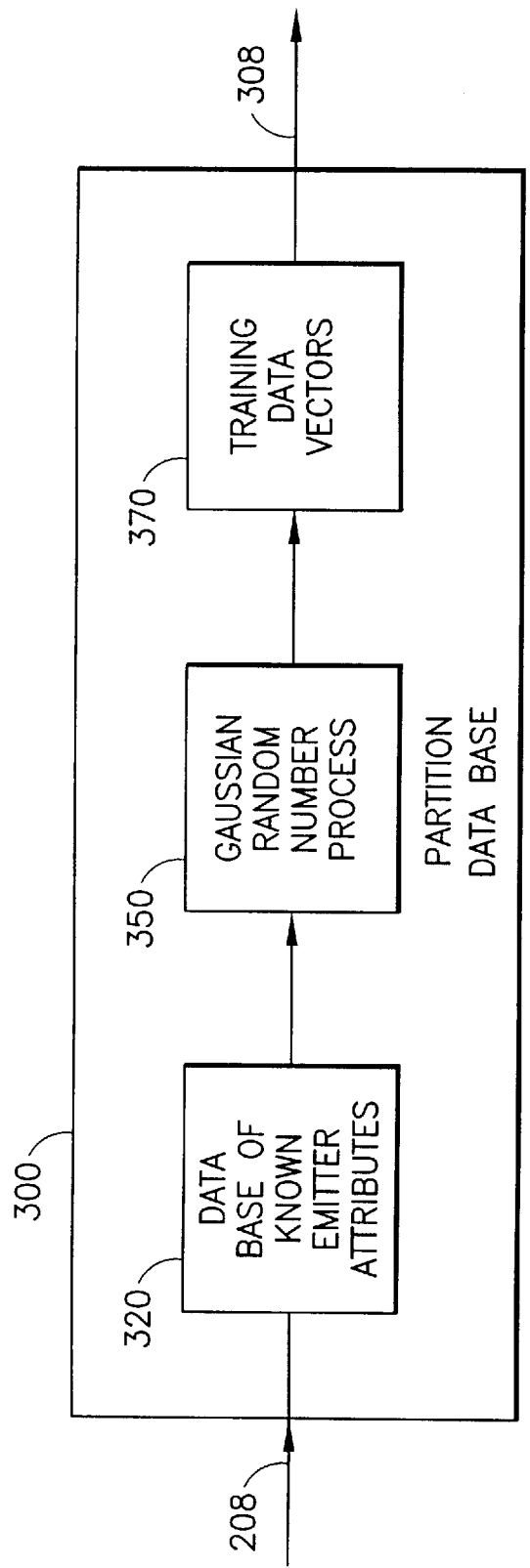
FIG. 2A is a block diagram illustrating the primary functional components for creating training vectors.

Referring to FIG. 2A, and by example, a database of known emitter attributes 320 representative of electronic support measure sensor observations 208 is processed to partition the data base. In the synthesized training data embodiment the block 350 can include adding Gaussian random numbers 350 of specified standard deviation to the nominal average of selected sensor attributes 320. For example, random numbers having a specified deviation of 0.2% are added to ten nominal carrier frequencies in a range of frequency bands as shown in FIG. 2C. Likewise, random numbers having a specified deviation of 0.2% are added to corresponding pulse repetition frequencies in a range of bands as shown in FIG. 2B in three distinct groups ranging from 400 pulses per second to 30,000 pulses per second. A final attribute, sector coverage is set at an angle of either 120 degrees coverage or 360 degrees coverage, for each emitter in the data base of known emitters 320. Adding the Gaussian random numbers 350 of specified standard deviation to the nominal averages of the selected sensor attributes 320, e.g. 10 distinct center frequencies, three possible pulse repetition frequencies per center frequency, and two possible sector coverage angles, results in the creation of a training data base 370 containing 60 emitter type. The training database 370 is also referred to herein as a knowledge database.

Figure 3:
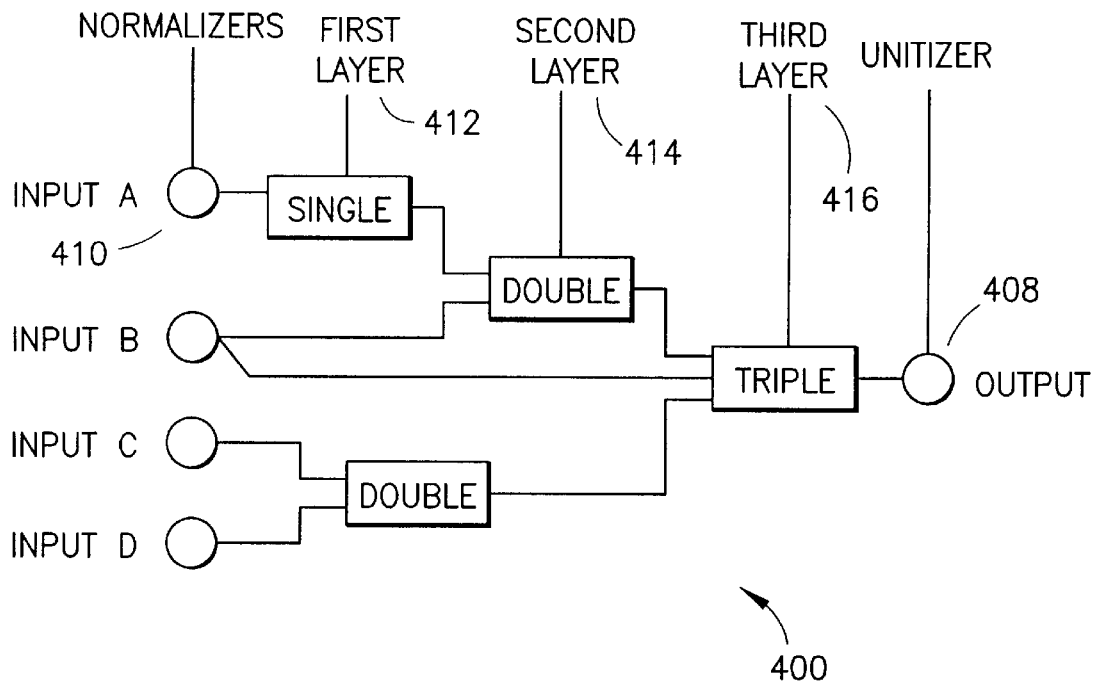
FIG. 3 is a block diagram of a polynomial neural network used to process the attribute data base.

As illustrated in FIG. 3, neural networks usually have of a a multiplicity of inputs, such as 410, and which typically include a plurality of nodes and a multitude of interconnected processing elements organized into several layers 412, 414, and 416. The nodes represent a polynomial equation with each of its terms represented by an input 410. Single nodes have one input, double nodes have two inputs, and triple nodes have three inputs. All nodes usually contain interconnected cross terms which provide data exchange among the nodes.

Figure 4:
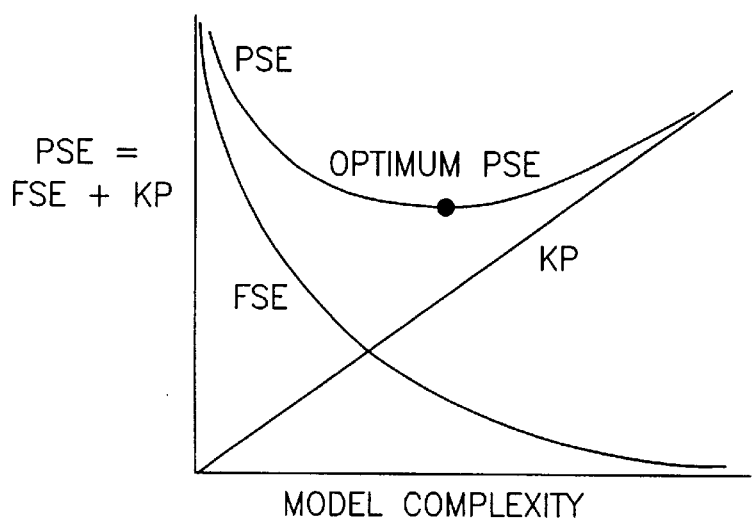
FIG. 4 depicts a graphical representation of neural network model complexity plotted against predicted squared error.

The neural network 400 has been implemented utilizing a computer process known in the art as the Abductory Induction Mechanism ( "AIM"), (see, for example, AIM-PC Version 1.0 User's Manual, Ab Tech Corporation, 1990). The AIM process uses a polynomial network with a supervised, abductive learning algorithm which reasons from general principles and facts to new facts while working with degrees of uncertainty. Reference in this regard can be had to Montgomery, Gerald J. and Keith C. Drake, "Abductive Networks", SPIE Apps of ANN Conference, Orlando, Fla., April 1990, and Shrier, Stefan, Roger L. Barron, and Lewey O. Gilstrap, "Polynomial and Neural Networks: Analogies and Engineering Applications", IEEE Press, International Conference on Neural Networks, 1987. The AIM neural network learns by testing different training data in a process that synthesizes layers representing polynomials up to and including the third degree. The process utilizes a predicted squared error ("PSE") method for selecting the network coefficients best able to separate the classes under examination. Mathematically, the PSE can be expressed as follows:

$$PSE = FSE + KP \tag{eq.1}$$

where FSE is the fitting squared error of the model on the training data and KP is a complexity penalty. The complexity penalty is mathematically expressed as:

$$KP = (CPM)(2K)(Sp^2)/N \tag{eq.2}$$

where CPM is a complexity penalty multiplier, K is the total number of coefficients, N is the number of training data, and Sp is an a priori estimate of the true error variance. Reference in this regard can be had to Richard Haberstroh and Ivan Kadar, Multi-Spectral Data Fusion Using Neural Networks in Signal Processing, Sensor Fusion, and Target Recognition II, SPIE Conference, Bellingham, Wash., Vol. 1955, 1993. FIG. 4 shows the relationship between PSE and neural network model complexity as a function of FSE and KP. For purposes of synthesizing the neural network 400, the CPM, number of layers, and terms defining the complexity of the network are preferably set to the AIM default parameters. The default sets the number of layers to a maximum of four, and provides for a CPM based on a best estimate determined by a variance of the output.

During the learning stage using synthesized data, a multiplicity of training vectors each containing, by example, 60 emitter types is applied to the inputs of the neural network as represented in FIG. 3. This training results in a self organized neural network capable of classifying subsequently processed unknown emitters into one of the 60 represented classes. In FIG. 1 the classification 408 as characterized by the network solution is combined with context identifying information 608 through a classifier 700.

Figure 5:
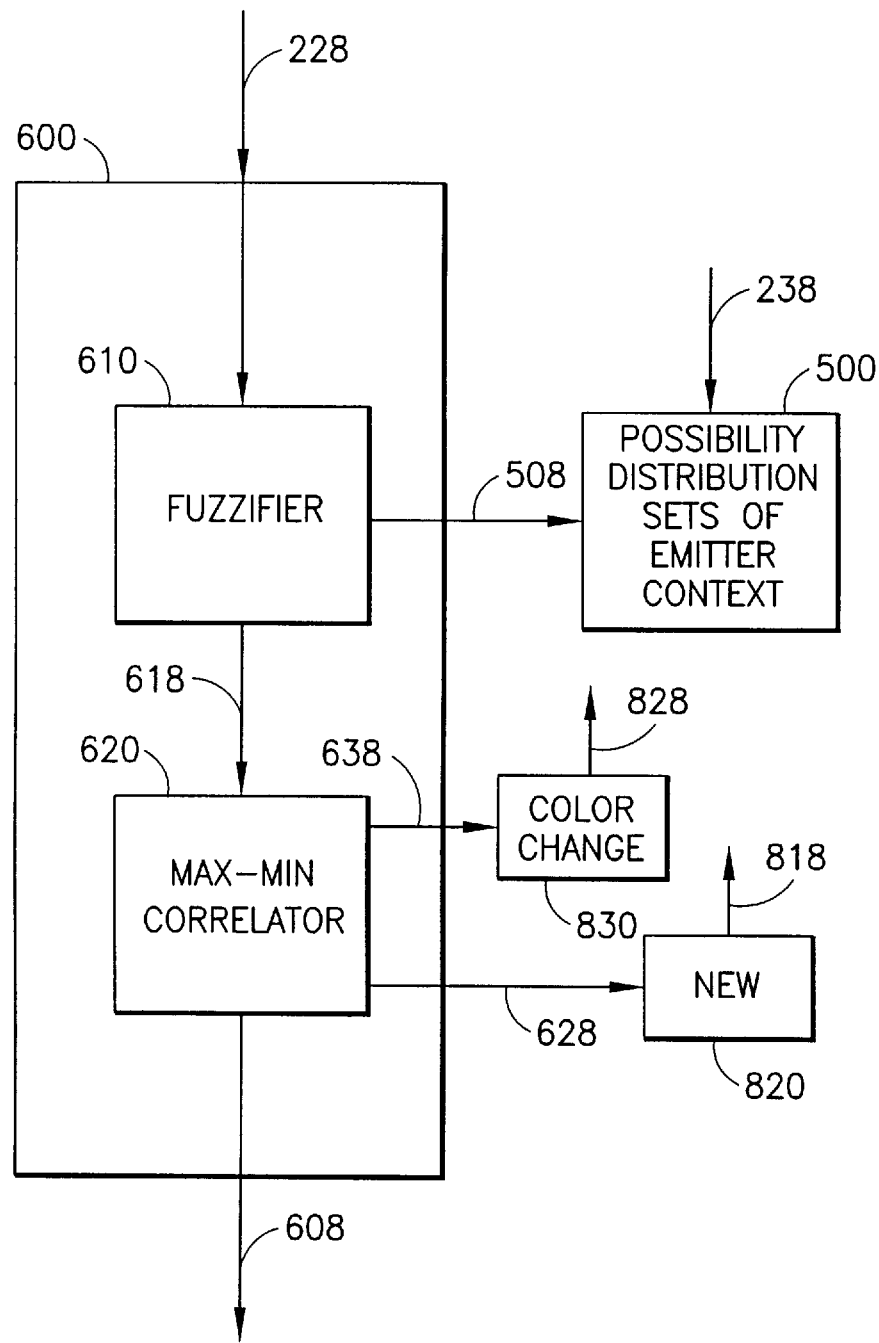
FIG. 5 is a block diagram of a fuzzy logic system having a possibility distribution input and outputs provided by a max-min correlation function.

As previously indicated, the accuracy of recognition dramatically improves when the product of the neural network solution 408 is combined with context information, transmission power, and bearing, by utilizing membership data derived from the fuzzy logic system 600. Referring to FIG. 5, a fuzzifier 610 carries out the function of applying a fuzzy logic paradigm to context data.

As is known in the art, fuzzy logic is a superset of Boolean logic that has been developed to handle logical statements that may have intermediate results between the traditional Boolean values of one and zero. It is a branch of mathematics currently utilized extensively for pattern recognition solutions, as well as for implementing some control functions.

Reference can be had to, by example, Zadeh, L. A., "Fuzzy Sets", Inform. Control, Vol. 8, 1986, and Zadeh, L. A., "Outline of a New Approach to the Analysis of Complex Systems and Decision Processes", IEEE Trans. Syst. Man and Cybern., Vol. SMC-3, No. 1, January 1973.

A fuzzy subset A of a set X can be defined as a set of ordered pairs, each with the first element from X, and the second element from the interval [0,1], with exactly one ordered pair present for each element of X. This defines a mapping between elements of the set and values in the interval [0,1]. The fuzzy subset A in X is characterized by a membership function $f_A(x)$ which associates with each point in X a real number in the interval [0,1], with the value of $f_A(x)$ at x representing the grade of membership of x in A. Likewise a fuzzy subset B in x is characterized by a membership function $f_B(x)$ which associates with each point in X a real number in the interval [0,1], with the value $f_B(x)$ at x representing the grade of membership of x in B. For any subset, the value zero denotes complete non-membership, the value one denotes complete membership, and values in between are used to represent intermediate grades of membership. Subsets such as A and B can be combined using Boolean logic operators of intersection, union, or complement. The logical intersection of A and B produces the smallest fuzzy set contained in both A and B, and the union of A and B produces the largest fuzzy set contained in both A and B. These operations produce max-min relationships as expressed mathematically by the following equations:

$$A \cap B = \mathrm{Min}[f_A(x), f_B(x)], x \in X \tag{eq.4}$$

$$A \cup B = \mathrm{Max}[f_A(x), f_B(x)], x \in X \tag{eq.5}$$

Referring to FIG. 5, these definitions allow for the construction of a probability distance metric between two membership functions, or possibility distributions, through a max-min correlation function 620 which provides a quantified outcome 608 to the classifier 700. The extended Boolean logic principles use algorithms based on rules of inference to, in accordance with an aspect of this invention, determine grades of membership that an unknown emitter has when compared to known emitters. The max-min operation creates such an inference mechanism in terms of a correlation distance (see,generally, the following journal articles: Togai, M. and Watanabe H., "A VLSI Implementation of Fuzzy Inference Engine" Toward an Expert System on a Chip", IEEE Signal Magazine, February 1985; Togai, Masaki and Hiroyuki Watanabe, "Expert System on a Chip: An Engine for Real-Time Approximate Reasoning", IEEE Expert, Fall 1986; and Kadar, Ivan and Erica Liebman, "Non-Bayesian Image Feature Detectors", SPIE Proceedings on Digital Optical Computing, SPIE Vol. 752, 1987).

Membership functions relating to the two context populations of power (P) and bearing (B) are fitted to two normalized possibility distributions 500, where the parameters are determined from known data obtained from the electronic support system 200 as follows:

$$F_P(x) = \exp\{-\frac{1}{2}[x-\mu P/\sigma P]^2\} \quad (eq6)$$

$$F_B(x) = \exp\{-\frac{1}{2}[x-\mu B/\sigma B]^2\} \quad (eq7)$$

A relative distance between a possibility distribution created from a known population of contexts, as exemplified by equation 6 and equation 7, and a context measurement, such as power or bearing acquired from incoming data, provides essentially a max-min operation quantifying the grade of membership for the context under observation. For each context class the distance property between possibility distributions is expressed mathematically as:

$$Cij = \{x : fi(x) = fj(x)\} \quad (eq.8)$$

where Ci,j: $0 \leq Ci,j \leq 1$ is the range of the max-min correlation distance between the two possibility distributions $fi(x)$ and $fj(x)$ representing data from the known contexts and the incoming context, respectively.

Figure 6:
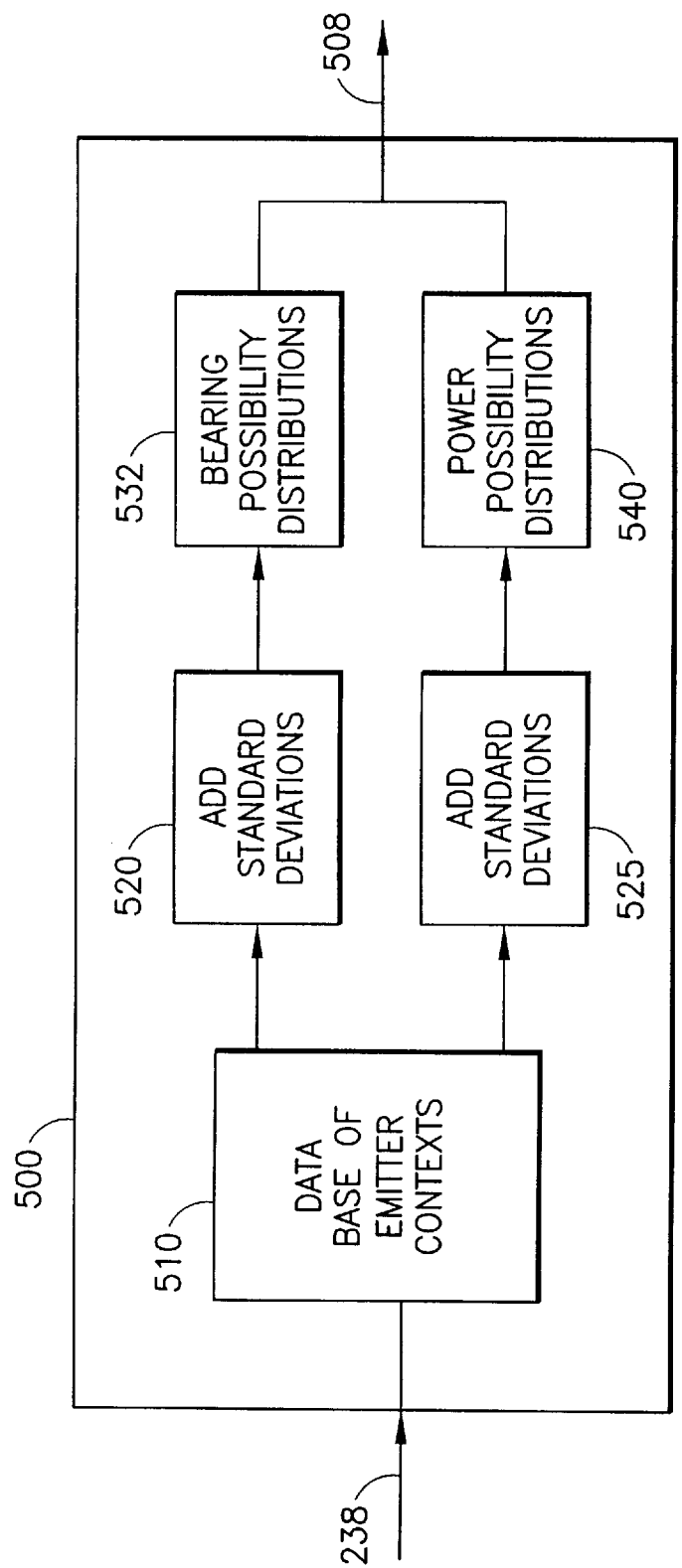
FIG. 6 is a block diagram illustrating the primary elements needed for creating the possibility distributions that are input to the fuzzy logic system of FIG. 5.

Referring to FIG. 6, simulated measurement data 510 representative of hypothetical electronic support sensor observations 238 are generated for selected bearing contexts of terrain and land mass. Once assembled, as depicted by functional block 530, this knowledge base, as described below, represents the possibility distribution function $F_B(x)$. Direction finding methods having high resolving power are used to determine the land sector size and degree of clustering. To emulate these features, known bearing data was divided into five separate bearing regions (see FIG. 7A). Each bearing region, represented by a Gaussian possibility distribution function, has a mean value width and specified standard deviation ranging from 2% to 10% selected by block 520 ($F_B(x)$). Each known emitter is then randomly assigned a region in which it operates.

Referring again to FIG. 6, simulated measurement data 510 representative of hypothetical electronic support system sensor observations 238 are also generated for selected transmitted power contexts. The transmitted power contexts are quantized into nominal radiation levels of 10, 20 and 30 kilowatts, respectively, to which is added standard deviation 525 of 10%. Once assembled, as depicted by functional block 540, this knowledge data base, as described below, represents the possibility distribution function $F_P(x)$. In addition, each emitter is marked as to whether it is capable of generating an effective isotropically radiated power at each power level.

The combination of preprocessed transmitted power and bearing are represented by the multi modal normal possibility distributions of FIG. 7B. These distributions are referenced to obtain the individual grades of membership as heretofore described for each transmitted power level and bearing level.

Figure 8:
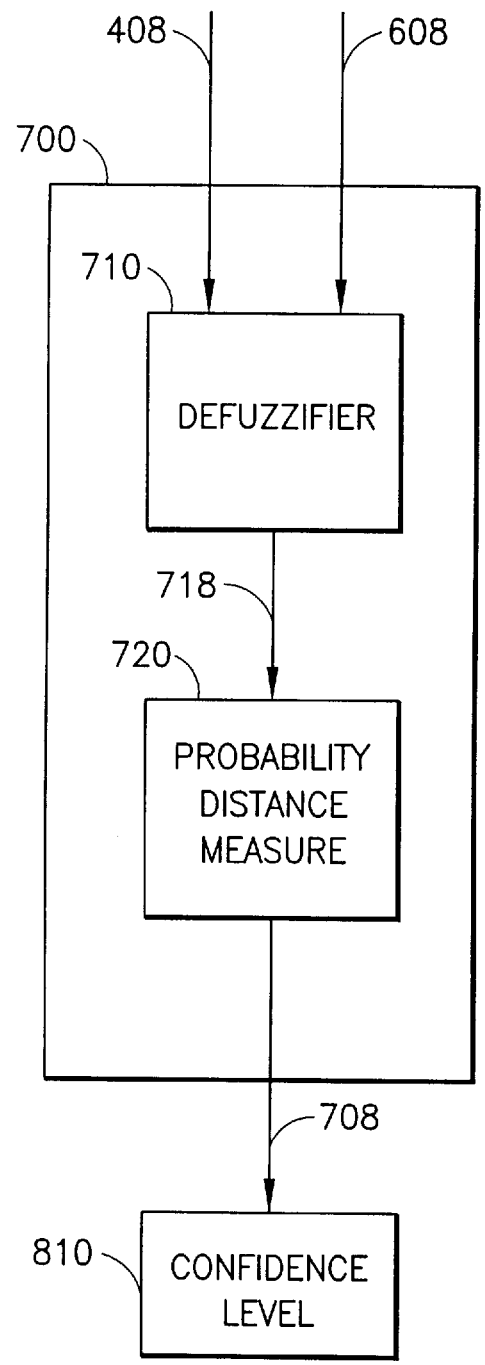
FIG. 8 is a block diagram illustrating a classifier receiving input from the fuzzy logic system and neural network and providing an output denoting a probability distance measurement.

As is shown in FIG. 8, the separate grades of membership 608 are combined with attribute identifying information 408 with classifier 700. Classifier 700 functions to compute the intersections of the sets of outcomes of the fuzzy logic system 600 and the neural network 400. As illustrated in FIG. 7C the probability distance measure 720 is formed from the product of the network solution 408 and the two grades in membership 608, representing power and bearing as depicted in functional block 710. The defuzzifier output 718 results in a probability distance measure 720 that indicates the solution value or functional recognition of an incoming emitter. Once identified, confidence levels 810 denoting the quality of fit are updated.

The fuzzy logic system 600 accounts for incoming emitters that have attributes classified by the neural network 400, but which cannot be provided a grade of membership because there is no corresponding power or bearing extant in the knowledge base. Referring to FIG. 5, if the possibility distribution function constructed on the basis of a priori contexts is incapable identifying an incoming emitter, for example, because the power lever detected is outside the range of power used to construct the possibility distribution, then the incoming emitter is classified as "new" 820 and the grade of memberships is recalculated for all the capable power levels, thereby updating the possibility distributions via 818 and adding the new emitter to the knowledge data base 510.

Referring to FIG. 5, if the emitters that are known to the system, and embodied in the possibility distribution functions a priori, are incapable operating in the region detected, then the emitter under observation is classified as a "color change" 830. In this case the grade of membership is recalculated for the region in which the emitter should be operating, thereby updating possibility distributions and adding the color change to the knowledge data base 510 via 828.

Figure 9A:
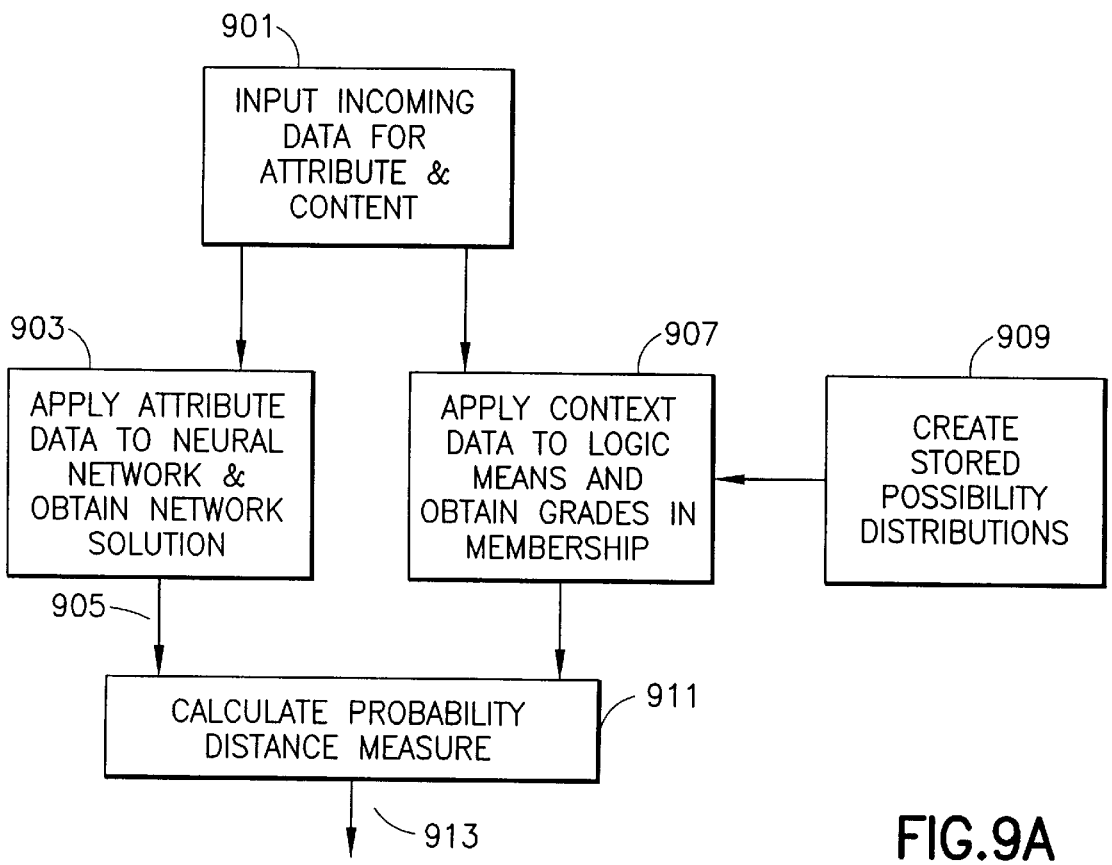
FIG. 9A is a flow chart of a method for recognizing and classifying features of incoming data.

The system as described herein is also implementable as a method for recognizing and classifying features of incoming data. Referring to the flow chart illustrated in FIG. 9A, such a method comprises the steps of inputting incoming data 901 representing attribute data and context data of an emitter; applying the attribute data to a neural network 903 which provides an output network solution responsive to the emitter's functional role; applying the context data to logic 907 having one or more stored possibility distributions 909 for computing a grade of membership; and calculating a probability distance measure 913 based on the product of the network solution 905 and the grade of membership 911.

Figure 9B:
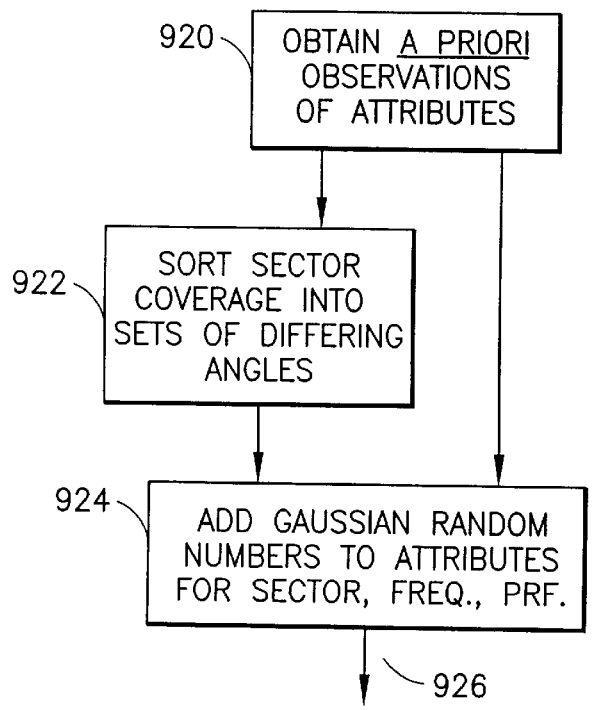
FIG. 9B is a flow chart of an exemplary method for creating an attribute training data base for synthesizing a neural network based on a priori observations.

The method for recognizing and classifying features of incoming data described herein also includes creating a training data base for the neural network. Referring to FIG. 9B, the steps of creating a training data base of synthesized data include: {a} obtaining a prior observations of a set of an emitter's salient attributes 920, such as a transmitter's center frequency, pulse repetition frequency, and sector coverage; {b} sorting the sector coverage into sets 922 of differing angular measure with a constant standard deviation; and {c} creating a simulated attribute knowledge base 926 by adding Gaussian random numbers 924 within a range of specified standard deviations to each center frequency, pulse repetition frequency and sector coverage.

Figure 9C:
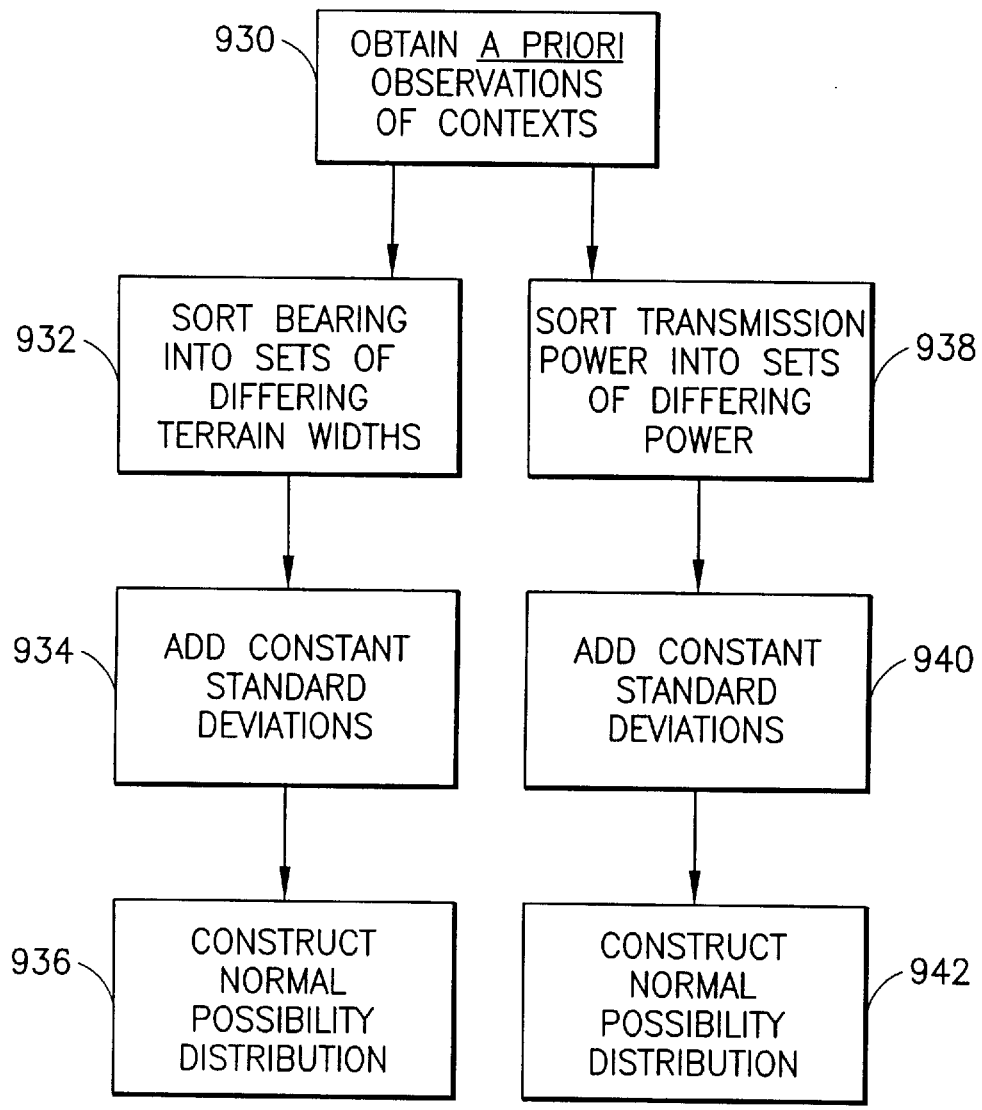
FIG. 9C is a flow chart of an exemplary method for creating possibility distributions based on a priori observations.

The method of recognizing and classifying features of incoming data also includes the step of having stored one or more possibility distributions against which incoming context data is compared in order to determine the grade in membership. Referring to FIG. 9C, the steps of creating the possibility distributions include: {a} obtaining a prior observations of a set of emitter's specific contexts 930, including transmitter power and bearing; {b} sorting the bearing into sets of differing width distance measurements 932 with constant standard deviations (block 934) creating a simulated bearing context knowledge base; {c} sorting the transmitter power 938 into sets of differing powers with constant standard deviations (block 940) creating a simulated power context knowledge base; and {d} using said simulated context knowledge bases to construct one or more normalized possibility distributions 936 and 942.

Although described above in the context of recognizing and classifying RF emitters, the teachings of this invention can be utilized as well with optical emitters. The teachings of this invention can also be applied to a wide variety of applications wherein it is desired to classify an object and/or to determine if an object's behavior is consistent with an expected behavior. Examples include, but are not limited to, the fields of medical diagnosis, credit checking, and financial markets.

As was indicated previously, in practice the training data base may represent data acquired from actual emitters, and do not require the artificial introduction of noise.

Thus, while preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A system for recognizing and classifying features of incoming data comprising:

input means for inputting synthesized or actual data representative of an attribute and a context of an emitter;

neural network means having an input to receive said incoming data representative of the attribute and providing an output network solution responsive to the emitter's functional role;

logic means having an input to receive said incoming data representative of the context, one or more stored possibility distributions, a membership function calculation means, and one or more outputs indicative of the emitters grade of membership based on a correspondence between the possibility distributions and the context; and means for classifying the emitter by calculating a probability distance measure based on the product of the network solution and the grade of membership.

2. A recognition system according to claim 1, wherein said neural network means comprises a synthesized neural network that is trained by extracting attributes from a training data base to thereby encode said neural network to classify the incoming data.

3. A recognition system according to claim 2, wherein said synthesized neural network contains a polynomial network means and a supervised abductive learning algorithm.

4. A recognition system according to claim 2, wherein said training data base comprises attributes based on a priori observations.

5. A recognition system according to claim 1, wherein the logic means includes means for extending conventional Boolean logic principles to the case of partial truth values between logical extremes of true and false.

6. A recognition system according to claim 1, wherein the logic means uses algorithms in combination with rules of inference to determine grades of membership of unknown emitters when compared to known emitters.

7. A recognition system according to claim 6, wherein a max-min operation is the rule of inference used in determining a correlation distance.

8. A recognition system according to claim 7 wherein the max-min correlation is used in combination with the output network solution and grade of membership to produce a probability distance metric.

9. A recognition system according to claim 1, wherein the logic means is a fuzzy logic system.

10. A recognition system according to claim 9, and further comprising means for updating neural network and fuzzy logic possibility distributions for adding new emitters and known emitters which have changed colors.

11. A recognition system according to claim 1, wherein said possibility distributions are obtained from a prior observations of known context and fitted into two normalized possibility distributions expressed by:

$$F_P(x) = \exp\{-\tfrac{1}{2}[x-\mu P/\sigma P]^2\}$$

$$F_B(x) = \exp\{-\tfrac{1}{2}[x-\mu B/\sigma B]^2\}.$$

12. A recognition system according to claim 1, wherein one or more of said outputs of said logic means indicates the emitter's grade of membership as a color.

13. A recognition system according to claim 1, wherein one or more of said outputs of said logic means indicates the emitter's grade of membership as a new emitter.

14. A method for recognizing and classifying features of incoming data, comprising the steps of:

inputting synthesized or actual data representative of an attribute and a context of an emitter;

applying the attribute data to a neural network which provides a network solution responsive to the emitter's functional role;

applying the context data to a logic means having one or more stored possibility distributions for computing a grade of membership; and calculating a probability distance measure based on the product of the network solution and the grade of membership.

15. A method for recognizing and classifying features of incoming data according to claim 14, wherein the step of applying the attribute data to a neural network includes a step of using a training data base based on synthesized or actual observations and encoding said network therefrom to thereafter classify the incoming data.

16. A method for recognizing and classifying features of incoming data according to claim 15, wherein the step of using includes a step of creating a training data base that includes the steps of:

a. creating an attribute knowledge base based on measurements of a set of emitter's attributes including a transmitter's center frequency, pulse repetition frequency, and sector coverage; and b. sorting the sector coverage into a plurality of sets of differing angular measure with a constant standard deviation.

17. A method for recognizing and classifying features of incoming data according to claim 14, wherein the stored possibility distributions are stored in accordance with the steps of:

a. obtaining a prior observations of a set of emitter's contexts including transmitter power and bearing;

b. sorting the bearing into sets of differing metric measurements creating a bearing context knowledge data base;

c. sorting the transmitter power into sets of differing power with a constant standard deviation creating a simulated power context knowledge base; and d. using said simulated context knowledge bases to construct one or more normalized possibility distributions; and e. storing the normalized possibility distributions for use by the logic means.

* * * * *